Dec. 17, 1929.  G. E. McCREA  1,739,798
AIRPLANE
Filed June 11, 1928    2 Sheets-Sheet 1
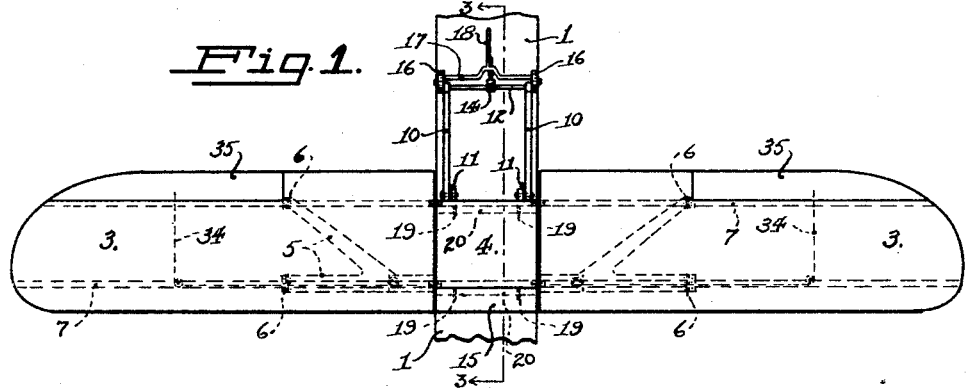
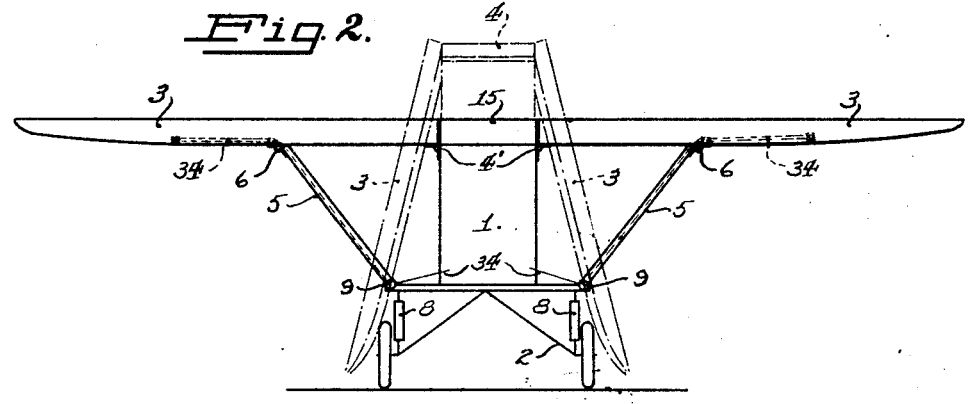
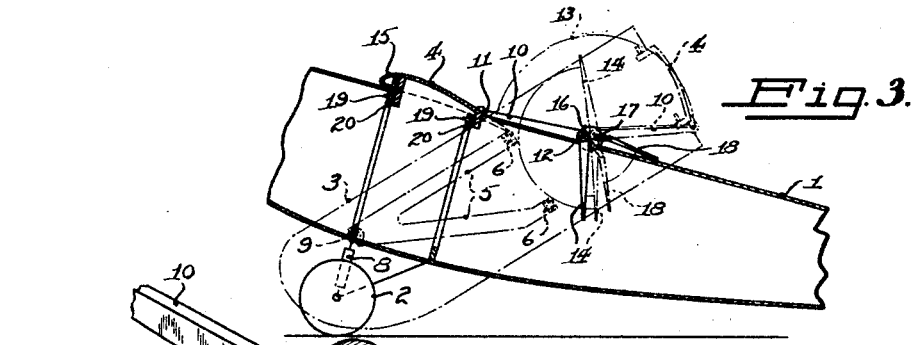
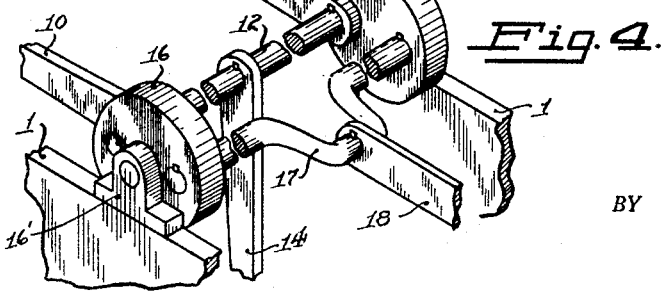
INVENTOR.
George E. McCrea
BY Booth & Booth
ATTORNEYS.

Dec. 17, 1929.  G. E. McCREA  1,739,798
AIRPLANE
Filed June 11, 1928  2 Sheets-Sheet 2
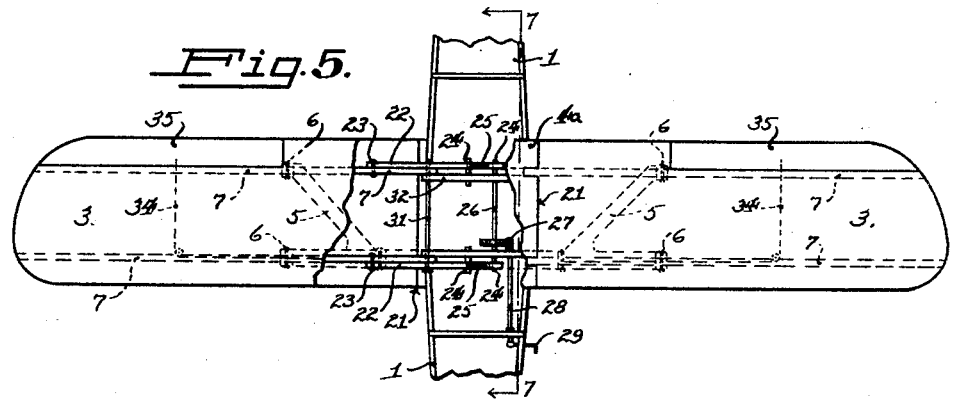
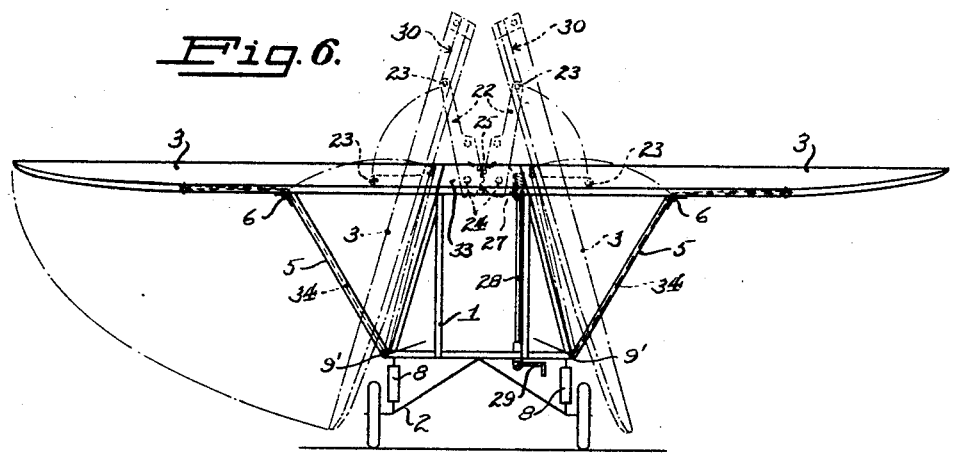
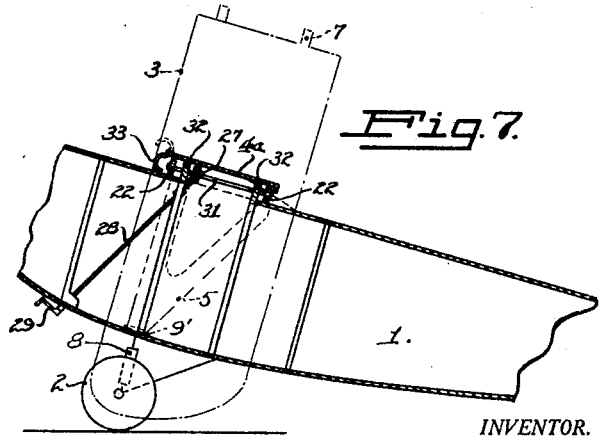
INVENTOR.
George E. McCrea
BY
Burt & Burt
ATTORNEYS.

Patented Dec. 17, 1929

1,739,798

UNITED STATES PATENT OFFICE

GEORGE E. McCREA, OF SAN FRANCISCO, CALIFORNIA

AIRPLANE

Application filed June 11, 1928. Serial No. 284,359.

My invention relates to airplanes of the monoplane type having foldable wings.

The principal objects of the invention are to provide an airplane in which the wings can be quickly and easily folded to occupy a relatively small space, and to provide ample strength and rigidity for the wings when extended. Other objects are to provide mechanism for mounting and folding the wings which can be operated by one man from a convenient position, and which will not interfere in any way with the normal operation of the plane or increase its parasitic resistance.

An airplane embodying my invention and having a normal wing span of 30 feet can be housed in a hangar approximately 10 feet high by 10 feet wide, thus occupying a space only one-third as great as an ordinary airplane of the same size. The wings can be folded by the pilot without getting out of the cockpit, so that he can, if he so desires, fold the wings immediately after landing and taxi to the hangar with the wings folded, thereby occupying less space upon the field and minimizing the danger of collision. In busy air-ports such action would materially lessen congestion on the field and in and around the hangars.

With the above and other objects and advantages in view, my invention will be fully described in the following specification, which should be read with the understanding that the form, construction and arrangement of the several parts may be varied, within the scope of the claims hereto appended, without departing from the spirit of the invention as set forth in said claims.

Reference should be had to the accompanying drawings, wherein:—

Fig. 1 is a partly diagrammatic plan view of an airplane embodying one form of my invention, the end portions of the fuselage being omitted as having no bearing upon the invention.

Fig. 2 is a partly diagrammatic front elevation, the wings being shown in flying position in full lines and folded in broken lines.

Fig. 3 is a longitudinal section taken on the line 3—3 of Fig. 1.

Fig. 4 is a perspective detail of the operating mechanism for folding the wings.

Fig. 5 is a partly broken plan view of a second form of my invention.

Fig. 6 is a partly diagrammatic front elevation thereof.

Fig. 7 is a longitudinal section taken approximately on the line 7—7 of Fig. 5.

In the drawings, the reference numeral 1 designates a fuselage of any suitable form and type. 2 is a supporting carriage, herein shown as a conventional form of landing gear, although it is to be understood that, when my invention is embodied in a seaplane, the supporting carriage would be constructed accordingly. 3 is the wing, which is made in two principal sections, as hereinafter described.

In the form of my invention shown in Figs. 1, 2, 3 and 4, the two end sections of the wing 3 are joined together by a short central section 4, the inner ends of said end sections being hinged, as at 4', to said central section. When the wing is in extended, or flying position, as shown in full lines, the central section 4 lies upon or is positioned close above the top of the fuselage, and forms, with the end sections 3, a continuous wing of usual form. Diagonal struts 5 extend from the supporting carriage 2 to the underside of the wing sections 3. These struts are preferably V-shaped, as shown in Figs. 1 and 3, and are pivotally connected at their upper ends, as at 6, with the spars 7 or other framework of the wing. Their lower ends are connected with the landing gear, preferably immediately above the shock-absorbers 8, by ball and socket or other universal pivotal connections 9.

The length and positions of the struts 5 are such that the wing sections 3 can fold downwardly to the position shown in broken lines. During this folding, the inner ends of said wing sections 3 and the central section 4 rise above the fuselage, and their outer ends move downwardly and inwardly to positions beside the landing gear, but clear of the ground.

The central wing section 4 is connected by one or more fore-and-aft lever arms 10, two such arms being shown in Fig. 1. Their forward ends are pivotally connected with said central wing section at 11, and their rear ends are pivotally connected with the fuselage, preferably by being secured to an oscillatable transverse shaft 12, Figs. 1 and 4. Therefore, when the wing is folded, and the central section 4 and the inner ends of the sections 3 rise, they are also moved rearwardly in an arcuate path about the shaft 12 as a center, said path being indicated by the broken line 13 in Fig. 3. A lever 14, Figs. 1, 3 and 4, secured upon the shaft 12, is shown as a simple example of means for operating the folding mechanism. Such a lever may be either within the fuselage, as shown, or outside, and in which case it would be secured upon the end of said shaft.

In its folded position, the wing occupies comparatively little space. Thus for example, a wing having a normal, or flying spread of 30 feet, will, when folded, occupy a space approximately 10 feet wide by 10 feet high, thereby permitting three airplanes to be housed in the space ordinarily occupied by one.

The central wing section 4 is of less width than the main section 3, and in order to complete the uniform width of the wing when in flying position, a fixed complementary section 15 is permanently secured to the top of the fuselage in such a position that it will be immediately in front of said central section, as shown in Figs. 1 and 3. This permits the wing to fold, at the hinged joints 4', without interference from the camber of its lower surface.

Any suitable means may be provided for locking the wing in flying position. As a preferred example of such means, I have shown in Figs. 1, 3 and 4, a mechanism for sliding the entire wing structure including its central section 4 rearwardly to free it from engagement with the fuselage. A pair of trunnion members 16 are rotatably mounted in brackets 16' in the frame or fuselage 1 and are rigidly connected by a transverse member which has an operating lever 18 secured to it. The shaft 12, to which the elevating arms 10 and the lever 14 are secured, is rotatably mounted in the trunnions 16 somewhat forward from the axis of their rotation in the brackets 16'. Therefore, when the lever 18 is swung downwardly, the shaft 12 and the arms 10 are carried a few inches toward the rear. The central wing section 4 is provided with dowels 19, Figs. 1 and 3, which are seated in corresponding sockets in the transverse frame members 20 of the fuselage when the wing is in flying position. The rearward movement of the wing caused by the movement of the lever 18 and the partial rotation of the trunnions 16 withdraws said dowels from their sockets and frees the wing section 4 from its connection with the fuselage permitting it to be elevated by the arm 10 and the lever 14. The operation of folding the wing is therefore as follows:—the lever 18 is first moved downwardly from its full line to its broken line position (Fig. 3), thereby unlocking the wing; then the lever 14 is moved from its lower broken line position forwardly and upwardly to its upper broken line position, thereby folding the wing as described above.

The form of my invention shown in Figs. 5, 6, and 7 is similar to that described above, except that the inner ends of the wing sections 3 move straight upwardly, instead of upwardly and rearwardly. The total width of the machine, when the wing is folded, is therefore the same as in the previously described form, but its height is somewhat greater. In this second form, the central wing section 4a is permanently secured to the top of the fuselage 1, the main wing sections 3 meeting said fixed central section at transverse joints 21 when the wing is in flying position.

As a means for folding the wing sections 3, I provide a pair of transverse levers 22 for each section, the outer ends of said levers being pivotally connected at 23 with the wing spars 7, and their inner ends being pivotally connected with the fuselage at 24. The struts 5 are the same as described above, except that simple pivotal connections 9' are sufficient at their lower ends, instead of the ball and socket joint used in the previous form. When the levers 22 are swung upwardly, the inner ends of the wing sections rise, and their outer ends move downwardly and inwardly as before. Fig. 6 shows the flying position in full lines and the folded position in broken lines.

Any suitable mechanism may be employed for elevating the levers 22. As an example of such mechanism, I have shown the opposite levers geared together by gear segments 25, so that both wing sections move together, and the levers of one section are fixed upon a shaft 26, which is operated by worm gearing 27, a shaft 28, and a conveniently located crank 29. In the position shown, the crank 29 is operable from the ground, but it will be apparent that it may be located in any desired position either within or without the fuselage.

The under sides of the wing sections are preferably provided with grooves indicated at 30 in Fig. 6, adjacent the spars 7, in which the levers 22 are seated when the wing is in flying position, in order to lessen parasitic resistance. To hold the wing sections securely locked in flying position, removable bolts 31 are provided, which pass through the levers 22, the wing spars 7, and fixed transverse fuselage members 32, as shown in Figs. 5 and 7. The bolts 31 are accessible by elevating a hinged cover 33, Fig. 7, which forms the forward edge of the fixed central wing section 4ª. It should be understood, however, that the above described locking means is merely an example of any convenient and suitable device for holding the wings securely in flying position.

It will be seen from the drawings and foregoing description that the use of my invention does not involve any material departure from standard airplane design except in the mechanism for folding the wing. The wing itself, when in flying position, has the normal form, section, position, and proportions; the struts 5 are of standard design except for the hinged joints at their ends, and are in the usual positions; the supporting or landing gear 2 is not affected in any way; and the arrangement of the wing-folding mechanism is such that there is no interference with either the design or carrying capacity of the fuselage.

In order to prevent interference with the control wires 34 of the ailerons 35, and to obviate any necessity for uncoupling said wires when the wing is folded, I prefer to run them through the struts 5, as indicated in Figs. 1, 2, 5 and 6. Any means consistent with good mechanical practice may be employed for guiding said wires at the hinged ends of the struts. It is assumed, of course, that the well known form of hollow strut is used.

I claim:—

1. An airplane comprising a fuselage; a wing formed with a joint in its central region and relatively movable end sections adapted to fold downwardly; struts pivotally connected at their upper ends with said wing sections and pivotally connected at their lower ends with said fuselage; and means connecting the inner ends of said wing sections with said fuselage and adapted to elevate said inner ends when said wing sections fold downwardly.

2. An airplane comprising a fuselage; a wing formed with relatively movable end sections adapted to fold downwardly; means connecting the inner ends of said wing sections with said fuselage and adapted to elevate said inner ends when said wing sections fold downwardly; and a complementary wing section extending between and pivotally connected with said movable sections and adapted to rise with their inner ends.

3. An airplane comprising a fuselage; a wing formed with relatively movable end sections; a pivotal connection between the inner ends of said sections; a lever connecting the inner ends of said sections with the fuselage and adapted to move said ends upwardly and rearwardly; and struts pivotally connecting said sections with the fuselage adapting their outer ends to move inwardly and downwardly.

4. An airplane comprising a fuselage; a wing formed with relatively movable end sections; a pivotal connection between the inner ends of said sections; means for elevating and moving rearwardly the inner ends of said sections; struts extending downwardly from the under sides of said sections to the lower portion of the fuselage; pivotal connections between said struts and said sections; and pivotal connections movable in two perpendicular planes between the lower ends of said struts and the fuselage.

5. An airplane comprising a fuselage; a wing formed with relatively movable end sections; means for folding said sections inwardly by elevating their inner ends and lowering their outer ends; inter-engaging means carried by the inner ends of said sections and said fuselage for locking said sections in flying position; and means for moving said sections to free said locking means, the last mentioned movement of said sections being distinct from their folding movement.

6. An airplane comprising a fuselage; a wing formed with relatively movable end sections; means for folding said sections inwardly by elevating their inner ends and lowering their outer ends; inter-engaging means carried by the inner ends of said sections and said fuselage for locking said sections in flying position; and means for moving said sections horizontally to free said locking means.

7. An airplane comprising a fuselage; a wing formed with a joint in its central region and relatively movable end sections; pivotal connections between the fuselage and said sections adapting them for folding inwardly; interengaging means carried by said sections and the fuselage for locking said sections in flying position; a longitudinally positioned lever connecting the inner ends of said sections with the fuselage; means for moving said lever longitudinally to free said locking means; and means for swinging said lever to fold said sections.

8. An airplane comprising a fuselage; a wing having foldable end sections; an aileron associated with each section; hollow struts pivotally connecting said sections with the fuselage and adapting them for folding downwardly and inwardly; and control lines for operating said ailerons, said lines being carried through said struts from the wing sections to the fuselage.

9. An airplane comprising a fuselage; a wing formed with relatively movable end sections extending outwardly from said fuselage and adapted to fold with their inner ends rising and their outer ends moving downwardly and inwardly; and a central complementary wing section extending across said fuselage between the inner ends of said end sections when in flying position and forming therewith a continuous wing structure.

In testimony whereof I have signed my name to this specification.

GEORGE E. McCREA.